United States Patent
Huang

(10) Patent No.: US 10,513,629 B2
(45) Date of Patent: Dec. 24, 2019

(54) SILICONE RELEASE COATING COMPOSITION AND ARTICLE HAVING CURED RELEASE COATING

(71) Applicant: Dow (Shanghai) Holding Co., Ltd., Shanghai (CN)

(72) Inventor: Fuming Huang, Shanghai (CN)

(73) Assignee: DOW (SHANGHAI) HOLDING CO., LTD., Shanghai (CN)

( * ) Notice: Subject to any disclaimer, the term of this patent is extended or adjusted under 35 U.S.C. 154(b) by 0 days.

(21) Appl. No.: 15/770,612

(22) PCT Filed: Oct. 26, 2015

(86) PCT No.: PCT/CN2015/092832
§ 371 (c)(1),
(2) Date: Apr. 24, 2018

(87) PCT Pub. No.: WO2017/070821
PCT Pub. Date: May 4, 2017

(65) Prior Publication Data
US 2018/0298232 A1 Oct. 18, 2018

(51) Int. Cl.
C08K 3/36 (2006.01)
C09D 183/04 (2006.01)
C08J 7/04 (2006.01)

(52) U.S. Cl.
CPC ............ *C09D 183/04* (2013.01); *C08J 7/047* (2013.01); *C08J 2483/05* (2013.01); *C08J 2483/07* (2013.01); *C08K 3/36* (2013.01); *C08K 2201/005* (2013.01); *C08K 2201/006* (2013.01)

(58) Field of Classification Search
CPC ................................ C08K 3/36; C09D 183/04
See application file for complete search history.

(56) References Cited

U.S. PATENT DOCUMENTS

| | | | | |
|---|---|---|---|---|
| 5,708,075 A | * | 1/1998 | Chung | C09D 183/04 427/387 |
| 5,906,893 A | * | 5/1999 | Stein | C09D 5/1675 428/447 |
| 6,806,339 B2 | | 10/2004 | Cray et al. | |
| 6,822,021 B1 | | 11/2004 | Kim et al. | |
| 7,470,725 B2 | | 12/2008 | Schwertfeger et al. | |
| 2002/0061998 A1 | * | 5/2002 | Cray | C08G 77/04 528/32 |
| 2010/0255205 A1 | | 10/2010 | Cray et al. | |
| 2014/0057111 A1 | | 2/2014 | Tomimatsu et al. | |
| 2018/0009997 A1 | | 1/2018 | Bhagwagar et al. | |

FOREIGN PATENT DOCUMENTS

| | | |
|---|---|---|
| EP | 0874032 B1 | 5/2003 |
| JP | H02180964 A | 7/1990 |
| JP | H07223213 A | 8/1995 |
| JP | H07331078 A | 12/1995 |
| JP | 2001064390 A | 3/2001 |
| JP | 2014028954 A | 2/2014 |
| JP | 2015067691 A | 4/2015 |
| JP | 2018510229 A | 4/2018 |
| KR | 20130134575 A | 12/2013 |
| WO | WO2007016068 A1 | 2/2007 |
| WO | 2012147812 A1 | 11/2012 |

OTHER PUBLICATIONS

English language translation JP 07331078 (Year: 1995).*
DOWSIL VM 2270 silica Data Sheet (Year: 2019).*
PCT/CN2015/092832 International Search Report dated Oct. 26, 2015, 3 pages.
English language abstract and machine translation for JPH02180964 (A) extracted from http://worldwide.espacenet.com database on May 4, 2018, 9 pages.
English language abstract and machine translation for JPH07223213 (A) extracted from http://worldwide.espacenet.com database on May 4, 2018, 13 pages.
English language abstract and machine translation for JPH07331078 (A) extracted from http://worldwide.espacenet.com database on May 4, 2018, 16 pages.
English language abstract and machine translation for KR20130134575 (A) extracted from http://worldwide.espacenet.com database on May 4, 2018, 20 pages.
Technical Data Sheet, "DOWSIL VM-2270 Aerogel Fine Particles", The Dow Chemical Company, 2017, 6 pages.
"Fabrication Process / VMC Method stands for Vaporized Metal Combustion Method", obtained from https://www.admatechs.co.jp/en/product-admafine-vmc.html on Sep. 2, 2019, 4 pages.
"Product List / Silica", obtained from https://www.admatechs.co.jp/en/product-admafine-vmc.html on Sep. 2, 2019, 3 pages.
English translation of Japanese Patent No. 07-331078 to Masahiko et al., 12 pages.
Machine assisted English translation of JP2015067691A obtained from https://patents.google.com on Oct. 16, 2019, 11 pages.

* cited by examiner

*Primary Examiner* — Margaret G Moore
(74) *Attorney, Agent, or Firm* — Warner Norcross + Judd LLP

(57) ABSTRACT

A silicone release coating composition is disclosed. The silicone release coating composition comprises: (A) an organopolysiloxane having at least two alkenyl groups in a molecule; (B) an organopolysiloxane having at least two silicon-bonded hydrogen atoms in a molecule; (C) organic modified functional silica particles having an average particle size of 5 μm to 15 μm and a BET specific surface area of 600 m$^2$/g to 800 m$^2$/g; and (D) a hydrosilylation reaction catalyst. The silicone release coating composition can form a coating with a lower release force to sticky adhesive.

11 Claims, No Drawings

SILICONE RELEASE COATING COMPOSITION AND ARTICLE HAVING CURED RELEASE COATING

CROSS-REFERENCE TO RELATED APPLICATIONS

This application is the National Stage of International Application No. PCT/CN2015/092832 filed on 26 Oct. 2015, the contents of which is hereby incorporated by reference.

TECHNICAL FIELD

The present invention relates to an silicone release coating composition. Furthermore, the present invention relates to an article having a release coating yielded by curing the composition.

BACKGROUND ART

Silicone release coating compositions typically comprise an organopolysiloxane having at least two alkenyl groups in a molecule, an organopolysiloxane having at least two silicon-bonded hydrogen atoms in a molecule, an anchorage additive, and a hydrosilylation reaction catalyst.

For example, Patent Document 1 discloses a silicone release coating composition comprising: 100 parts by weight of an organopolysiloxane having at least two alkenyl groups in a molecule, 0.2 to 50 parts by weight of an organopolysiloxane having at least three silicon-bonded hydrogen atoms in a molecule, 0.1 to 10 parts by weight of a hydrophobic spherical silica powder having an average diameter of 0.1 to 5 μm, and a platinum group compound in a catalytic amount, can form a silicone release coating exhibiting anti-blocking property.

However, the silicone release coating does not possess a low release force due to high cure density.

Therefore, there still exists a need in the art for obtaining a silicone release coating composition which can form a release coating possessing a lower release force at same coat weight (CVV) to sticky adhesive, stable release force, and good anchorage to the substrate.

PRIOR ART DOCUMENTS

Patent Documents

Patent Document 1: Japanese Unexamined Patent Application Publication No. H07-331078

SUMMARY OF THE INVENTION

The present invention was pursued in order to solve the problems cited above and has as an object the introduction of a low release force silicone release coating application. The release coating composition is applied to coat a layer on films or paper substrate and cured under thermal addition to form a coated substrate. Another object of the present invention is to provide an article having silicone release coating with a low release force for tape release, sticky adhesive or label release application.

DISCLOSURE OF THE INVENTION

A silicone release coating composition of the present invention comprises:

(A) an organopolysiloxane having at least two alkenyl groups in a molecule;
(B) an organopolysiloxane having at least two silicon-bonded hydrogen atoms in a molecule, in an amount sufficient to provide 0.8 to 5 moles of silicon-bonded hydrogen atoms in this component to 1 mole of the alkenyl groups in component (A);
(C) organic modified functional silica particles having an average particle size of 5 μm to 15 μm and a BET specific surface area of 600 m$^2$/g to 800 m$^2$/g, in an amount of 0.1 to 5% by weight of the composition, and
(D) a hydrosilylation reaction catalyst in a catalytic amount.

Component (A) may be a linear organopolysiloxane, branched organopolysiloxane, or a mixture thereof. And the branched organopolysiloxane may have at least one $SiO_{4/2}$ unit in a molecule.

The silicone release coating composition of the present invention may further comprise (E) a hydrosilylation reaction inhibitor, in an amount of 0.05 to 2 parts by weight per 100 parts by weight of component (A).

The silicone release coating composition of the present invention may further comprise (F) an anchorage additive, in an amount of 0.01 to 10 parts by weight per 100 parts by weight of component (A).

An article of the present invention has a release coating yielded by curing the silicone release coating composition.

A cured release coating-bearing sheet-form substrate of the present invention is characterized by curing the silicone release coating composition in the form of a thin film on a sheet-form substrate. The sheet-form substrate may be a glassine paper, clay-coated paper, polyolefin-laminated paper, thermoplastic resin film, or a metal foil.

BEST MODE FOR CARRYING OUT THE INVENTION

Component (A) is a base component of the silicone release coating composition of the present invention, and is an organopolysiloxane having at least two alkenyl groups in a molecule. Examples of the alkenyl group are vinyl, allyl, butenyl, pentenyl, hexenyl, heptenyl, octenyl, nonenyl, decenyl, undecenyl, and dodecenyl, and vinyl groups are preferable. Examples of silicon-bonded groups other than the alkenyl groups are alkyl groups such as methyl, ethyl, propyl, butyl, octyl, and so forth; aralkyl groups such as benzyl, phenethyl, and so forth; aryl groups such as phenyl, tolyl, xylyl, and so forth; and methyl groups are preferable.

Component (A) may be a linear organopolysiloxane, branched organopolysiloxane, or a mixture thereof. Component (A) is preferably a branched organopolysiloxane, most preferably a branched organopolysiloxane having at least one $SiO_{4/2}$ unit in a molecule.

The branched organopolysiloxane may be represented by the following average unit formula:

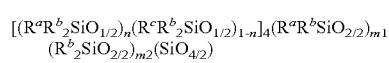

In the formula, each $R^a$ is an alkenyl group having 2 to 8 carbon atoms; each $R^b$ is an alkyl group having 1 to 8 carbon atoms or a phenyl group; each $R^c$ is a group selected from the group consisting of an alkyl group having 1 to 8 carbon atoms, alkoxy group having 1 to 8 carbon atoms, and a hydroxyl group; there are at least three $R^a$ in a molecule; at least 50% of the total number of $R^a$, $R^b$, and $R^c$ in a molecule are alkyl groups having 1 to 8 carbon atoms; n is 0 or 1; m1 is a number with a value of at least 1; m2 is a number with a value of at least 0; and m1+m2=15 to 995.

In preferable organopolysiloxane, $R^a$ is vinyl or hexyenyl group, m1 ranges 0 to 20 and total number of siloxane units (=m1+m2+4) ranges from 50 to 400. The preferred viscosity of the branched organopolysiloxane ranges from 50 to 1,000 mPa·s. The vinyl content is preferably within the range of 0.10 to 3.0 wt %.

Typical examples of this alkyl group having 1 to 8 carbon atoms are methyl, ethyl, propyl, and so forth, with a methyl group being preferable. Typical examples of the alkenyl group having 2 to 8 carbon atoms are vinyl, allyl, hexenyl, and so forth, with vinyl group being preferable. The alkoxy group having 1 to 8 carbon atoms can be methoxy, ethoxy, and so forth.

The $R^a R^b_2 SiO_{1/2}$ unit can be exemplified by the $ViMe_2SiO_{1/2}$ unit, $HexMe_2SiO_{1/2}$ unit, $ViMePhSiO_{1/2}$ unit, and $HexMePhSiO_{1/2}$ unit (wherein Vi denotes the vinyl group, Hex denotes the hexenyl group, Me denotes the methyl group, and Ph denotes the phenyl group; this also applies hereinafter). The $R^c R^b_2 SiO_{1/2}$ unit can be exemplified by the $Me_3SiO_{1/2}$ unit, $(HO)Me_2SiO_{1/2}$ unit, $(MeO)Me_2SiO_{1/2}$ unit, and $Me_2PhSiO_{1/2}$ unit. The combination of these units (for example, $ViMe_2SiO_{1/2}$ unit and $Me_3SiO_{1/2}$ unit) is possible in the same molecule.

The $R^a R^b SiO_{2/2}$ unit can be exemplified by the $ViMeSiO_{2/2}$ unit, and $HexMeSiO_{2/2}$ unit. The $R^b_2 SiO_{2/2}$ unit can be exemplified by the $Me_2SiO_{2/2}$ unit, and $MePhSiO_{2/2}$ unit. The combination of these units (for example, $Me_2SiO_{2/2}$ unit and $ViMeSiO_{2/2}$ unit) is possible in the same molecule.

Component (A) may include a linear organopolysiloxane. The linear organopolysiloxanes are exemplified by a polydimethylsiloxane having alkenyl groups only in its molecular terminals, polydimethylsiloxane having alkenyl groups only in its side-chain positions, and a polydimethylsiloxane having alkenyl groups in its molecular terminals and its side-chain positions. The linear organopolysiloxane gradually ascends onto the coating formed when curing occurs the composition and thereby imparts an excellent slipperiness to the surface of the cured coating. The linear organopolysiloxane possesses pendant alkenyl group, which can form covalent bond with cured system by hydrosilylation. And the trialkylsiloxy terminal is not cured with the system, which can help lead partial of molecular chain migrate to the surface of cured release coating. This property can provide the cured release coating with a slippery touch feeling and low release force. Siloxane having a moderate viscosity can provide applicable viscosity of the final release coating bath for multiple rolls coater processing, and also can have an appropriate reactivity when vulcanization.

Component (B) is a crosslinking agent for the silicone release coating composition of the present invention, and is an organopolysiloxane having at least two silicon-bonded hydrogen atoms in a molecule. The bonding position of the silicon-bonded hydrogen atoms is not particularly limited, and, for example, they may be bonded in molecular chain terminal position, side-chain position, or at both positions. Silicon-bonded organic groups encompass phenyl and alkyl having 1 to 8 carbon atoms, such as methyl, ethyl, propyl, butyl, octyl, and so forth, and preferably at least 50% of the total number of these organic groups is alkyl having 1 to 8 carbon atoms. The methyl group is preferred among these alkyl groups from the standpoint of the properties of the cured coating and the ease of production. The molecular structure of component (B) is exemplified by straight chain, branched chain, branched, and cyclic.

Component (B) may have a viscosity at 25° C. of 1 to 1,000 mPa·s and preferably 5 to 500 mPa·s. The basis for this is as follows: when the viscosity at 25° C. is less than 1 mPa·s, component (B) readily volatilizes out of the organopolysiloxane composition; the organopolysiloxane composition takes on long cure times at above 1,000 mPa·s.

Component (B) can be exemplified by trimethylsiloxy-endblocked methylhydrogenpolysiloxanes, trimethylsiloxy-endblocked dimethylsiloxane.methylhydrogensiloxane copolymers, dimethylhydrogensiloxy-endblocked dimethylsiloxane.methylhydrogensiloxane copolymers, cyclic methylhydrogenpolysiloxanes, cyclic methylhydrogensiloxane.dimethylsiloxane copolymers, tris(dimethylhydrogensiloxy)methylsilane, and tetra(dimethylhydrogensiloxy)silane.

Component (B) is incorporated in an amount sufficient to provide a value of 0.8:1 to 5:1 for the molar ratio of silicon-bonded hydrogen atoms in this component to alkenyl groups in component (A) and preferably in an amount sufficient to provide a value of 0.9:1 to 3:1 for this molar ratio, i.e. incorporated at 1.5 to 10 parts by weight, in each case per 100 parts by weight of component (A). The curability is reduced when this molar ratio is less than the lower limited cited above, while a large peel resistance value occurs when the cited upper limit is exceeded and practical releasability is not obtained.

Component (C) can provide a release coating yielded by curing the silicone release coating composition of the present invention with a low release force, and is organic modified functional silica particles having an average particle size of 5 μm to 15 μm and a BET specific surface area of 600 m$^2$/g to 800 m$^2$/g. Component (C) may be high porosity silica particles which have greater than 90% of porosity. Component (C) has on its surface organic functional group such as trimethylsilyl, triethylsilyl, dimethylvinylsilyl, dimethylphenylsilyl. As the result, it is completely hydrophobic.

A method for manufacturing of component (C) is not limited. For example, U.S. Pat. No. 7,470,725 describes a method comprising the following steps:
a) modifying the surface of the silica aerogels by silylation agent; and
b) drying the surface-modified gel obtained in step a).

The silylating agent can in principle be in any aggregate state but is preferably in liquid form and/or is a gas or vapor. If the silylating agent is used as a gas and/or vapor the temperature of the aqueous silica aerogels is preferably between 20° C. and 100° C., with particular preference between 40° C. and 100° C., and, in particular, between 60° C. and 100° C. Under pressure, higher temperatures are also possible in order to avoid boiling of the water in the gel capillaries. If the silylating agent is used as a liquid the temperature of the aqueous silica aerogels is preferably between 20° C. and 100° C. Under pressure, higher temperatures are also possible in order to avoid boiling of the water in the gel capillaries. If the silylating agent is used as a gas and/or vapor it may be present during the reaction in a gas stream or in a static gas atmosphere. The temperature of the silylating agent or agents in the gas phase can also be increased by means of pressure or by an additional gas stream.

Such organic modified functional silica particles are commercially available as "Dow Corning® VM-2270 Aerogel Fine Particles" from Dow Corning Corporation.

Component (D) is a hydrosilylation reaction catalyst that promotes the hydrosilylation reaction between the silicon-bonded hydrogen atoms in component (B) and the alkenyl groups in component (A). There are no particular limitations on component (D) other than that it is a catalyst used for the hydrosilylation reaction, and component (D) can be specifically exemplified by platinum-type catalysts such as chloroplatinic acid, alcohol-modified chloroplatinic acid, chloroplatinic acid/olefin complexes, chloroplatinic acid/ketone complexes, platinum/alkenylsiloxane complexes, platinum tetrachloride, platinum micropowder, solid platinum supported on a support such as alumina powder or silica powder, platinum black, olefin complexes of platinum, carbonyl complexes of platinum, and the powdery thermoplastic resin (e.g., methyl methacrylate resin, polycarbonate resin, polystyrene resin, silicone resin, and so forth) that incorporates a platinum-type catalyst as previously listed.

Other examples are rhodium catalysts such as [Rh$(O_2CCH_3)_2]_2$, Rh$(O_2CCH_3)_3$, Rh$_2(C_8H_{15}O_2)_4$, Rh$(C_5H_7O_2)_3$, Rh$(C_5H_7O_2)(CO)_2$, Rh(CO)[Ph$_3$P]$(C_5H_7O_2)$, RhX$_3$$(R^d{}_2S)_3$, $(R^e{}_3P)_2$Rh(CO)$_x$, $(R^e{}_3P)_2$Rh(CO)H, Rh$_2X_2Y_4$, H$_a$Rh$_b$(E)$_c$Cl$_d$, and Rh[O(CO)R$^e$]$_{3-n}$(OH)$_n$ (wherein, X is the hydrogen atom, chlorine atom, bromine atom, or iodine atom; Y is alkyl, CO, or C$_8$H$_{14}$; R$^d$ is alkyl, cycloalkyl, or aryl; R$^e$ is alkyl, aryl, alkyloxy, or arylyoxy; E is an olefin; a is 0 or 1; b is 1 or 2; c is an integer from 1 to 4; d is 2, 3, or 4; and n is 0 or 1) and iridium catalysts such as Ir(OOCCH$_3$)$_3$, Ir(C$_5$H$_7$O$_2$)$_3$, [Ir(Z)(E)$_2$]$_2$, and [Ir(Z)(Dien)]$_2$ (wherein, Z is a chlorine atom, bromine atom, iodine atom, or an alkoxy group; E is an olefin; and Dien is cyclooctadiene).

Viewed from the perspective of the ability to accelerate the reaction, chloroplatinic acid, platinum/vinylsiloxane complexes, and olefin complexes of platinum are preferred, and the chloroplatinic acid/divinyltetramethyldisiloxane complex, chloroplatinic acid/tetramethyltetravinylcyclotetrasiloxane complex, and platinum/alkenylsiloxane complexes, e.g., the platinum.divinyltetramethyldisiloxane complex, platinum/tetramethyltetravinylcyclotetrasiloxane complex, and so forth, are particularly preferred.

Component (D) is incorporated in a catalytic amount, and in general is incorporated at 10 to 600 ppm and preferably is incorporated at 5 to 500 ppm, in each case as the amount of metal in component (D) with reference to the total weight of the silicone release coating composition of the present invention.

In addition to the components described in the preceding, the silicone release coating composition of the present invention also contains a hydrosilylation reaction inhibitor (E) in order to render it thermosetting while improving the storage stability by inhibiting gelation and curing at ambient temperature. This hydrosilylation reaction inhibitor can be exemplified by alkynyl alcohols, en-yne compounds, organonitrogen compounds, organophosphorus compounds, and oxime compounds and can be specifically exemplified by alkynyl alcohols such as 3-methyl-1-butyn-3-ol, 3,5-dimethyl-1-hexyn-3-ol, 3-methyl-1-pentyn-3-ol, 3-phenyl-1-butyn-3-ol, and so forth; by en-yne compounds such as 3-methyl-3-penten-1-yne, 3,5-dimethyl-1-hexyn-3-ene; and by benzotriazole, 1-ethynyl-1-cyclohexanol, and methylvinylcyclosiloxanes.

The amount of component (E) is not limited, but is generally in the range of 0.05 to 2 parts by weight, and preferably in the range of 0.01 to 2 parts by weight, in each case per 100 parts by weight of component (A), and may be selected as appropriate in view of the type of hydrosilylation reaction inhibitor, the properties and amount of incorporation of the hydrosilylation reaction catalyst, the amount of alkenyl groups in component (A), and the amount of silicon-bonded hydrogen atoms in component (B).

In addition to the components described in the preceding, the silicone release coating composition of the present invention also contains an anchorage agent (F) in order to enhance the adhesion of the cured release coating to a substrate. Component (F) is exemplified by a reaction product of a fluid polyorganosiloxane having at least one alkenyl group and at least one silanol group in a molecule with a hydrolysable silane having at least one epoxide group.

The fluid polyorganosiloxane used in the preparation of the anchorage additive generally contains at least one alkenyl group and at least one silanol group. The polyorganosiloxane generally contains a chain of at least 3 siloxane units and is preferably a substantially linear polydiorganosiloxane. The polyorganosiloxane preferably has a degree of polymerisation of at least 4 and preferably at least 6 siloxane units. The polyorganosiloxane typically has a degree of polymerisation up to 30, 50 or 200 siloxane units. The polyorganosiloxane can for example have a viscosity in the range 2 to 200 mm$^2$/s at 25° C. The alkenyl group can for example have from 2 to 6 carbon atoms, for example a vinyl or 5-hexenyl group. The polyorganosiloxane usually also contains alkyl groups, particularly alkyl groups having 1 to 4 carbon atoms such as methyl or ethyl groups and may contain aryl groups such as phenyl. The alkenyl groups can be present as pendant groups, for example the copolymer can be a polymethylvinylsiloxane, or a copolymer of methylvinylsiloxane units and dimethylsiloxane units, or a copolymer of divinylsiloxane units and dimethylsiloxane units. Alternatively or additionally the alkenyl groups can be present as terminal groups, for example in methylvinylsilanol terminal units. The silanol groups are preferably present in terminal units such as dimethylsilanol or methylvinylsilanol terminal units. Most preferably the polyorganosiloxane is a polydiorganosiloxane having terminal silanol groups at both ends of the siloxane chain, although part or all of the polyorganosiloxane may have one silanol end group and one Si-alkoxy end group, for example a dimethylmethoxysilyl end unit. The polyorganosiloxane can for example be formed by the reaction of methylvinyldimethoxysilane and dimethyldimethoxysilane in the presence of a silane hydrolysis catalyst such as a base or an acid.

The hydrolysable silane which is reacted with the polyorganosiloxane to form the anchorage additive generally contains at least one epoxide group in a molecule. The epoxide group can for example be present as a glycidyl group or a 3,4-epoxycyclohexyl group. Examples of suitable hydrolysable silanes include 3-glycidoxypropyltrimethoxysilane, 3-glycidoxypropyltriethoxysilane, methyl(3-glycidoxypropyl)dimethoxysilane, methyl(3-glycidoxypropyl)diethoxysilane, 2-(3,4-epoxycyclohexyl)ethyltrimethoxysilane and 3-(3,4-epoxycyclohexyl)propyltrimethoxysilane.

The fluid polyorganosiloxane and the hydrolysable silane can be reacted at elevated temperature and/or in the presence of a silanol condensation catalyst. The catalyst can for example be a base such as potassium hydroxide, sodium hydroxide, potassium silanolate or a phosphazene base, or can be an acid such as HCl, or can be a titanate ester or an organic compound of tin. The temperature of reaction is preferably in the range 50 to 150° C. The novel anchorage additive thus prepared generally contains at least one epoxy group, at least one alkenyl group and at least one alkoxy group in its molecule.

Such anchorage additives are commercially available as "Syl-Off® 297 Anchorage Additive", "Syl-Off® SL 9250 Anchorage Additive" and "Syl-Off® SL 9176 Anchorage Additive" from Dow Corning Corporation.

The amount of component (F) is not limited, but is generally in the range of 0.01 to 10 parts by weight, and preferably in the range of 0.01 to 5 parts by weight, in each case per 100 parts by weight of component (A).

A cured low release force silicone release coating that exhibits better slipperiness and a suitable peel resistance value with respect to tacky substances can be formed on the surface of a sheet-form substrate, by uniformly coating the silicone release coating composition of the present invention as described above on the surface of any of various sheet-form substrates, e.g., glassine paper, cardboard, clay-coated paper, polyolefin-laminated paper and particularly polyethylene-laminated paper, thermoplastic resin film (e.g., polyester film, polyethylene film, polypropylene film, polyamide film), natural fiber fabrics, synthetic fiber fabrics, metal foils (e.g., aluminum foil), and so forth, and heating under conditions suitable for causing components (A) and (B) to undergo crosslinking through the hydrosilylation reaction.

Generally 100 to 200° C. is appropriate for the curing temperature of the silicone release coating composition of the present invention on the sheet-form substrate, but curing temperatures above 200° C. can be used when the substrate possesses a good heat resistance. The method of heating is not particularly limited and can be exemplified by heating in a hot air circulation oven, passage through a long oven, or radiant heating using an infrared lamp or a halogen lamp. Curing can also be effected by using heating in combination with exposure to ultraviolet radiation. When component (D) is a platinum/alkenylsiloxane complex catalyst, even when this catalyst is incorporated at 50 to 200 ppm as the amount of platinum metal with reference to the total quantity of the composition, a cured coating that exhibits an excellent adherence to sheet-form substrates and excellent release properties with respect to tacky substances can be readily obtained in a brief period of time, i.e., 40 to 1 second, at 100 to 150° C.

The silicone release coating composition of the present invention is especially preferably applied on at least one side of sheet-form substrate with multiple rolls coater. With regard to the tacky substance that can be applied to the release sheet or film yielded by the application and curing of the silicone release coating composition of the present invention onto the surface of a sheet-form substrate, this tacky substance can be, for example, any of various pressure-sensitive adhesives and various adhesives, and examples thereof are acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Other examples are asphalt, sticky foods such as mochi (i.e. rice cake), glues and pastes, and bird lime. Preferred application of present invention is multiple rolls coater with in situ two side coating process.

The composition of the present invention is useful for the formation of cured coatings that exhibit better surface slipperiness and an excellent low release performance versus tacky substances, and in particular is well suited as a cured release coating-forming agent for process paper, asphalt packaging paper, and various plastic films. In addition, sheet-form substrates bearing a release coating formed by the cure of the composition of the present invention are well-suited for use in particular for process paper, wrapping or packaging paper for tacky substances and sticky substances, pressure-sensitive adhesive tape, pressure-sensitive labels, and so forth.

EXAMPLES

Practical Examples and Comparative Examples are given below in order to specifically describe the present invention; however, the present invention is not limited to the examples that follow. "SiH/Vi" in below Tables 2 to 4 indicates the ratio of the number of moles of silicon-bonded hydrogen atoms in component (B) per 1 mole of the vinyl group in component (A). Raw materials for silicone release coating compositions of the Practical Examples and Comparative Examples are shown in below Table 1.

TABLE 1

| Nomenclature | Chemical description |
|---|---|
| Component (a-1) | Siloxane composed of $SiO_{4/2}$, $Me_2SiO_{2/2}$, $Me_3SiO_{1/2}$, and $ViMe_2SiO_{1/2}$ units, viscosity is about 450 mPa · s |
| Component (a-2) | Siloxane composed of $SiO_{4/2}$, $Me_2SiO_{2/2}$, $Me_3SiO_{1/2}$, and $ViMe_2SiO_{1/2}$ units, viscosity is about 4,000 mPa · s |
| Component (a-3) | Gum-like trimethylsiloxy-terminated dimethylsiloxane-methyhexenylsiloxane copolymer |
| Component (b-1) | Trimethylsiloxy-endblocked methylhydrogenpolysiloxane having 20 mPa · s |
| Component (c-1) | Syl-Off ® SL 9176 Anchorage Additive alkoxy containing alkenyl/epoxy functional organopolysiloxane anchorage promoter |
| Component (d-1) | Dow Coning ® VM-2270 Aerogel Fine Particles; BET surface area: 600-800 $m^2/g$ Average particle size: 5-15 μm |
| Component (d-2) | Gasil ® Silica 23D; BET surface area: 290 $m^2/g$ Average particle size: 4.6 μm |
| Component (e-1) | 1.5% by weight of Pt-1,3-divinyl-1,1,3,3-tetramethyldisiloxane complex in dimethyvinylsiloxy-terminated dimethylpolysiloxane having a viscosity of 450 mPa · s |
| Component (f-1) | 1-ethynyl-cyclohexan-1-ol |
| Component (f-2) | 3-methyl-1-butyn-3-ol |

Evaluation Processes:
(1) Coat weight (CW before Rub-off): use X-Ray to detect the coat weight of silicone by Oxford lab-x 3500 instrument manufactured by Oxford Instruments PLC, Oxon, United Kingdom. Use uncoated PET as blank. Refer to FINAT Test Method No. 7 (FINAT Technical Handbook 7th edition, 2005).

(2) Coat weight after Rub off (CW after Rub-off): test the coat weight of the coated release coating using Oxford lab-x 3500 instrument. Then use Abrasion Tester (Elcometer 1720) to rub the sample 30 cycles at a speed of 30 cycles/minute. Finally, test the coat weight again to measure the relative anchorage performance.

(3) Anchorage rate (RO %): The Anchorage rate (RO %) is recorded as (CW after Rub-off)/(CW before Rub-off)× 100%.

(4) Release force (RF-RT): the 180 degree peeling test is used to measure release force from liner with Tesa 7475 standard tape which was laminated on coated release coating, loaded weight of 20 $g/cm^2$ on laminated sample and left under RT (room temperature) for 20 hours. After 20 hours, remove the load and wait for 30 minutes. Then test the release force by Chem Instruments AR-1500. Refer to FINAT Test Method No. 10 (FINAT Technical Handbook 7th edition, 2005).

(5) Release force (RF-70° C. aging): the 180 degree peeling test is used to measure release force from liner with Tesa 7475 standard tape which was laminated on coated release coating, loaded weight of 20 $g/cm^2$ on laminated sample and left under 70° C. for 20 hours. After 20 hours, remove the load and wait for 30 minutes. Then test the release force by Chem Instruments AR-1500. Refer to FINAT Test Method No. 10 (FINAT Technical Handbook 7th edition, 2005).

(6) SAS (Subsequent Adhesive Strength, indicator of migration): test tape is laminated by Nitto Denko 31B tape on coated release coating, load weight of 20 g/cm² and left under 70° C. for 20 hours. After 20 hours, remove the load and wait for 30 minutes at room temperature. Then transfer the 31B tape on PET substrate and wait for another 1 hour. Test the release force by Chem Instruments AR-1500. In SAS test, laminate 31B tape on PTFE substrate and treat the PTFE sample the same way as release coating sample. The SAS value is recorded as $RF_{release}/RF_{PTFE} \times 100\%$. Refer to FINAT Test Method No. 11 (FINAT Technical Handbook 7th edition, 2005).

(7) Extractible %: The cure characteristics of the coatings were assessed by measuring the percentage of extractable in the coatings after their cure. This was performed by first determining the coating weight of a standard sized sample of a substrate with a cured coating by x-ray fluorescence using a LabX 3000 X-ray fluorescence spectrometer manufactured by Oxford Instruments PLC, Oxon, United Kingdom. The coated samples were then placed in a glass bottle with solution of methyl isobutyl ketone solvent, to extract any un-reacted siloxane which has not been cross-linked into the coating matrix, or which had adhered to the substrate. After a predetermined period of time shaking bottle (30 min immersed in MIBK), the sample was removed from the solvent, dried, and the coat weight was re-measured. The percentage of coating weight loss due to solvent extraction is calculated.

Practical Examples 1 and 2, and Comparative Example 1

Formulations of silicone release coating compositions of the Practical Examples 1 and 2, and Comparative Example 1 were shown in the following Table 2. The compositions were coated on PET substrates by a coater, and then cured under 140° C. for 30 seconds. The performance of the compositions were also shown in Table 2.

TABLE 2

| | | Comparative Example 1 | Practical Example 1 | Practical Example 2 |
|---|---|---|---|---|
| Silicone Release Coating Composition (parts by weight) | Component (a-1) | 97.4 | 97.4 | 97.4 |
| | Component (a-2) | 2.0 | 2.0 | 2.0 |
| | Component (b-1) | 2.0 | 2.0 | 2.0 |
| | Component (c-1) | 0.6 | 0.6 | 0.6 |
| | Component (d-1) | 0 | 0.5 | 1 |
| | Component (e-1) | 2.6 | 2.6 | 2.6 |
| | Component (f-1) | 0.6 | 0.6 | 0.6 |
| | SiH/Vi | 1.9 | 1.9 | 1.9 |
| Properties | RO % | 93.8 | 96.6 | 96.5 |
| | RF-RT (g/inch) | 4.4 | 2.6 | 2.7 |
| | RF-70° C. aging (g/inch) | 5.7 | 4.8 | 4.7 |
| | SAS (%) | 94.5 | 91.8 | 88.4 |
| | Extractible % | 3.9 | 6.3 | 4.5 |

Practical Examples 3 Through 6, and Comparative Example 2

Formulations of silicone release coating compositions of the Practical Examples 3 through 6, and Comparative Example 2 were shown in the following Table 3. The compositions were coated on PET substrates by a coater, and then cured under 140° C. for 30 seconds. The performance of the compositions were also shown in Table 3.

TABLE 3

| | | Comp. Ex. 2 | Prac. Ex. 3 | Prac. Ex. 4 | Prac. Ex. 5 | Prac. Ex.6 |
|---|---|---|---|---|---|---|
| Silicone Release Coating Composition (Parts by weight) | Component (a-1) | 97.4 | 89.6 | 89.6 | 81.8 | 81.8 |
| | Component (a-2) | 2.0 | 1.8 | 1.8 | 1.7 | 1.7 |
| | Component (a-3) | 0 | 7.9 | 7.9 | 16.1 | 16.1 |
| | Component (b-1) | 2.0 | 2.1 | 2.1 | 2.2 | 2.2 |
| | Component (c-1) | 0.6 | 0.6 | 0.6 | 0.6 | 0.6 |
| | Component (d-1) | 0 | 0.25 | 0.5 | 0.25 | 0.25 |
| | Component (e-1) | 2.6 | 2.6 | 2.6 | 2.6 | 2.6 |
| | Component (f-1) | 0.6 | 0.6 | 0.6 | 0.5 | 0.5 |
| | Component (f-2) | 0 | 0.04 | 0.04 | 0.08 | 0.08 |
| | Toluene | 85.2 | 85.0 | 85.0 | 84.7 | 84.7 |
| | SiH/Vi | 1.9 | 1.9 | 1.9 | 1.9 | 1.9 |
| Properties | RO % | 86.8 | 85.0 | 94.7 | 96.6 | 93.0 |
| | RF-RT (g/inch) | 3.4 | 2.4 | 3.1 | 2.8 | 2.9 |
| | RF-70° C. aging (g/inch) | 5.9 | 5.3 | 5.2 | 5.3 | 5.2 |
| | SAS (%) | 91.1 | 92.0 | 91.2 | 92.5 | 93.4 |
| | Extractible % | 2.9 | 3.7 | 4.1 | 2.5 | 4.8 |

Practical Example 7, and Comparative Examples 3 and 4

Formulations of silicone release coating compositions of the Practical Example 7, and Comparative Examples 3 and 4 were shown in the following Table 4. The compositions were coated on PET substrates by a coater, and then cured under 140° C. for 30 seconds. The performance of the compositions were also shown in Table 4.

TABLE 4

| | | Comparative Example 3 | Practical Example 7 | Comparative Example 4 |
|---|---|---|---|---|
| Silicone Release Coating Composition (parts by weight) | Component (a-1) | 97.4 | 89.6 | 97.4 |
| | Component (a-2) | 2.0 | 1.8 | 2.0 |
| | Component (a-3) | 0 | 7.9 | 0 |
| | Component (b-1) | 2 | 1.93 | 2 |
| | Component (c-1) | 0.6 | 0.6 | 0.6 |
| | Component (d-1) | 0 | 0.25 | 0 |
| | Component (d-2) | 0 | 0 | 0.25 |
| | Component (e-1) | 2.6 | 2.6 | 2.6 |
| | Component (f-1) | 0.6 | 0.6 | 0.6 |
| | Component (f-2) | 0 | 0.04 | 0 |
| | Toluene | 85.2 | 85.0 | 85.2 |
| | SiH/Vi | 1.9 | 1.9 | 1.9 |
| Properties | RO % | 86.6 | 96.7 | 90.6 |
| | RF-RT (g/inch) | 3.3 | 2.5 | 3.4 |
| | RF-70° C. aging (g/inch) | 6.3 | 5.3 | 6.0 |
| | SAS (%) | 95.6 | 90.3 | 91.2 |
| | Extractible % | 1.3 | 1.4 | 0.4 |

INDUSTRIAL APPLICABILITY

The silicone release coating composition of the present invention is useful for the formation, on the surface of sheet-form substrates, of a cured coating with a lower release force to sticky adhesive, low migration and good anchorage to the substrate. Sheet-form substrates bearing a cured coating from the aforesaid composition are useful for process paper/film, paper/film for wrapping or packaging tacky substances, pressure-sensitive tapes, pressure-sensitive labels, and so forth.

The invention claimed is:

1. A silicone release coating composition comprising:
   (A) an organopolysiloxane having at least two alkenyl groups in a molecule;
   (B) an organopolysiloxane having at least two silicon-bonded hydrogen atoms in a molecule, in an amount to provide 0.8 to 5 moles of silicon-bonded hydrogen atoms to 1 mole of the alkenyl groups in component (A);
   (C) organic modified functional silica particles having an average particle size of 5 μm to 15 μm and a BET specific surface area of 600 m$^2$/g to 800 m$^2$/g, in an amount of 0.1 to 5% by weight of the composition; and
   (D) a hydrosilylation reaction catalyst in a catalytic amount.

2. The silicone release coating composition according to claim 1, wherein component (A) is a linear organopolysiloxane, a branched organopolysiloxane, or a mixture thereof.

3. The silicone release coating composition according to claim 2, wherein component (A) comprises the branched organopolysiloxane and has at least one SiO$_{4/2}$ unit in a molecule.

4. The silicone release coating composition according to claim 1, further comprising (E) a hydrosilylation reaction inhibitor, in an amount of 0.05 to 2 parts by weight per 100 parts by weight of component (A).

5. The silicone release coating composition according to claim 4, further comprising (F) an anchorage additive, in an amount of 0.01 to 10 parts by weight per 100 parts by weight of component (A).

6. An article having a release coating formed by curing the silicone release coating composition according to claim 1.

7. A cured release coating-bearing sheet-form substrate formed by curing the silicone release coating composition according to claim 1 in the form of a thin film on a sheet-form substrate.

8. The cured release coating-bearing sheet-form substrate according to claim 7, wherein the sheet-form substrate is a glassine paper, a clay-coated paper, a polyolefin-laminated paper, a thermoplastic resin film, or a metal foil.

9. The silicone release coating composition according to claim 1, further comprising (F) an anchorage additive, in an amount of 0.01 to 10 parts by weight per 100 parts by weight of component (A).

10. The silicone release coating composition according to claim 3 wherein the branched organopolysiloxane is of the following average unit formula:

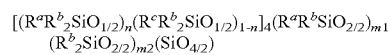

where each $R^a$ is an alkenyl group having 2 to 8 carbon atoms; each $R^b$ is an alkyl group having 1 to 8 carbon atoms or a phenyl group; each $R^c$ is a group selected from the group consisting of an alkyl group having 1 to 8 carbon atoms, an alkoxy group having 1 to 8 carbon atoms, and a hydroxyl group; there are at least three $R^a$ in a molecule; at least 50% of the total number of $R^a$, $R^b$, and $R^c$ in a molecule are alkyl groups having 1 to 8 carbon atoms; n is 0 or 1; m1 is a number with a value of at least 1; m2 is a number with a value of at least 0; and m1+m2=15 to 995.

11. The silicone release coating composition according to claim 10, further comprising:
   (E) a hydrosilylation reaction inhibitor; and
   (F) an anchorage additive.

* * * * *